(12) United States Patent
Kadowaki

(10) Patent No.: US 9,335,566 B2
(45) Date of Patent: May 10, 2016

(54) PHOTOCHROMIC LENS FOR EYE GLASSES

(75) Inventor: Shinichiro Kadowaki, Tokyo (JP)

(73) Assignee: HOYA CORPORATION, Tokyo (JP)

(*) Notice: Subject to any disclaimer, the term of this patent is extended or adjusted under 35 U.S.C. 154(b) by 126 days.

(21) Appl. No.: 14/110,605

(22) PCT Filed: Apr. 13, 2012

(86) PCT No.: PCT/JP2012/060167
§ 371 (c)(1),
(2), (4) Date: Feb. 24, 2014

(87) PCT Pub. No.: WO2012/141306
PCT Pub. Date: Oct. 18, 2012

(65) Prior Publication Data
US 2014/0198296 A1 Jul. 17, 2014

(30) Foreign Application Priority Data
Apr. 13, 2011 (JP) ................. 2011-089563

(51) Int. Cl.
G02C 7/10 (2006.01)
G02B 1/04 (2006.01)
C08F 212/36 (2006.01)
G02B 5/23 (2006.01)
C08F 2/44 (2006.01)

(52) U.S. Cl.
CPC . G02C 7/102 (2013.01); C08F 2/44 (2013.01); C08F 212/36 (2013.01); G02B 1/041 (2013.01); G02B 1/043 (2013.01); G02B 5/23 (2013.01)

(58) Field of Classification Search
CPC ........ G02B 1/041; C08F 212/36; G02C 7/102
See application file for complete search history.

(56) References Cited

U.S. PATENT DOCUMENTS

| | | | | |
|---|---|---|---|---|
| 3,217,052 A * | 11/1965 | Meek et al. | ........... | 585/839 |
| 4,880,667 A | 11/1989 | Welch | | |
| 6,034,193 A * | 3/2000 | Henry et al. | ........... | 526/222 |
| 6,417,273 B1 * | 7/2002 | Koinuma et al. | ........ | 525/123 |
| 6,602,603 B2 * | 8/2003 | Welch et al. | ........... | 428/412 |
| 6,669,873 B1 * | 12/2003 | Smith et al. | ........... | 252/586 |
| 8,017,720 B2 * | 9/2011 | Bojkova et al. | .......... | 528/375 |
| 8,691,926 B2 * | 4/2014 | Tanaka et al. | ........... | 526/336 |
| 2001/0020061 A1 | 9/2001 | Florent et al. | | |
| 2004/0041287 A1 * | 3/2004 | Engardio et al. | .......... | 264/1.7 |
| 2004/0109133 A1 * | 6/2004 | Kadowaki | ............. | 351/163 |
| 2005/0254003 A1 * | 11/2005 | Jani et al. | ............. | 351/160 R |
| 2006/0182977 A1 * | 8/2006 | Takenaka et al. | ......... | 428/423.1 |
| 2010/0074262 A1 | 3/2010 | Breit et al. | | |
| 2012/0329899 A1 * | 12/2012 | Kawabe et al. | ........... | 522/33 |
| 2014/0198296 A1 * | 7/2014 | Kadowaki | ............. | 351/159.61 |

FOREIGN PATENT DOCUMENTS

| | | |
|---|---|---|
| CN | 101548508 A | 9/2009 |
| JP | A 61-228402 | 10/1986 |
| JP | A 62-10604 | 1/1987 |
| JP | A 5-34649 | 2/1993 |
| JP | A 5-164994 | 6/1993 |
| JP | A 8-169923 | 7/1996 |
| JP | A 10-338869 | 12/1998 |
| JP | A 11-508943 | 8/1999 |
| JP | A 11-511765 | 10/1999 |
| JP | A 2003-48942 | 2/2003 |
| JP | A 2009-120536 | 6/2009 |
| WO | WO 00/73365 A1 | 12/2000 |

OTHER PUBLICATIONS

Apr. 14, 2014 Office Action issued in Chinese Patent Application No. 201280018341.0.
May 22, 2012 Search Report issued in International Patent Application No. PCT/JP2012/060167 (with translation).
Feb. 7, 2013 International Preliminary Report on Patentability issued in International Patent Application No. PCT/JP2012/060167 (with translation).

* cited by examiner

Primary Examiner — Michael A Salvitti
(74) Attorney, Agent, or Firm — Oliff PLC

(57) ABSTRACT

[Problem] To provide a photochromic lens for eye glasses, which has a high refractive index and excellent light-controlling properties and has such a constitution that the weight and thickness of the lens can be reduced. [Solution] Provided is a photochromic lens for eye glasses, which is produced by polymerizing a polymerizable composition prepared by dissolving a photochromic compound into a monomer mixture comprising a first radically polymerizable monomer represented by general formula (I), a second radically polymerizable monomer represented by general formula (II) and divinylbenzene that has a purity of 50% or more and contains a divinylbenzene component and an ethylvinylbenzene component at a total content of 90% or more.

2 Claims, No Drawings

PHOTOCHROMIC LENS FOR EYE GLASSES

TECHNICAL FIELD

The present invention relates to a photochromic lens for eye glasses using a plastic lens, more particularly, to a photochromic lens for eye glasses, which has a small thickness and is lightweight even when it is of a high diopter, has a high developed color density and has a high rate of coloration and decoloration.

BACKGROUND ART

In recent years, extremely many kinds of organic photochromic dyes has been developed, and photochromic dyes capable of being obtained as commercially available products have been increasing. The application thereof to a lens for eye glasses also becomes popular along with the trend of plasticization on the marketplace, and a photochromic lens made of plastic, applying an organic photochromic dye comes onto the market for use in eye glasses.

As to methods for manufacturing a photochromic lens, there are disclosed (1) a method of coating a resin liquid containing a photochromic compound on a lens, heating the same to cause the photochromic compound to permeate the lens surface layer, after that, removing the coated resin film, and applying a curable film thereon (for example, see Patent Literature 1), and (2) a method of dissolving a photochromic compound into a lens coating liquid, and coating and curing the same on the lens surface (for example, see Patent Literature 2).

However, in the method of (1), in order to obtain a sufficient photochromic density, it is necessary to cause the photochromic compound with a high concentration to permeate the lens surface and there is a problem in which a lens base material is limited to a material to be highly permeated. Therefore, in terms of heat resistance, mechanical strength and the like, a satisfactory level as a lens for eye glasses is not attained. In addition, in the method of (2), there is a limitation on the solubility of the photochromic compound into the coating liquid and the securement of a sufficient coloration density is difficult.

Furthermore, in these methods, since a film is formed by coating the coating liquid on lens surfaces of variously curved shapes, a high-accuracy technology of homogenizing the film and a high-accuracy technology of controlling a film thickness, which correspond to these methods, are required, and thus the manufacturing cost becomes high.

In contrast, as manufacturing methods other than (1) and (2), (3) a method of dissolving previously a photochromic compound into a monomer mixed liquid for a lens, pouring it into a mold, and after that, polymerizing it to obtain a photochromic lens is disclosed (for example, see Patent Literature 3 and Patent Literature 4).

More particularly, in Patent Literature 3, a photochromic lens is disclosed, the lens having a sufficient light-controlling performance, and excellent surface hardness and abrasion resistance that are important as a lens. In addition, in Patent Literature 4, a photochromic lens is disclosed, the lens having a low yellow level before coloration and having wavelength in coloration made longer, to thereby allow a deep tone to be expressed.

Methods of (1) and (2) require a special process for imparting light controllability such as a coating treatment after lens molding. In contrast to this, the method of (3) is preferable as a manufacturing method because the light-controlling performance is imparted simultaneously at the time of the lens molding and thereby manufacturing number of processes is lowered, and in addition, since the photochromic compound can easily be dispersed homogeneously in a base material, the method of (3) is extremely useful as a method for mass-producing a lens having a certain light-controlling performance irrespective of the lens shape and having a stable quality.

Furthermore, as specific examples of the method of (3), in Patent Literature 5 and Patent Literature 6, it is described that the combination of a specific aromatic (meth)acrylic ester and aromatic vinyl makes it possible to obtain a good light-controlling performance.

CITATION LIST

Patent Literature

Patent Literature 1: Japanese Patent Application Laid-Open No. 61-228402
Patent Literature 2: Japanese Patent Application Laid-Open No. 62-10604
Patent Literature 3: Japanese Patent Application Laid-Open No. 5-34649
Patent Literature 4: Japanese Patent Application Laid-Open No. 8-169923
Patent Literature 5: Published Japanese translation of PCT patent application No. 11-508943
Patent Literature 6: Published Japanese translation of PCT patent application No. 11-511765

SUMMARY OF INVENTION

Technical Problem

In any of photochromic plastic lenses obtained by the method of (3) disclosed in Patent Literature 3, Patent Literature 4, Patent Literature 5 and Patent Literature 6, the refractive index is in the range of 1.51 to 1.57.

For making a lens having a further reduced thickness and weight, a resin material for light-controlling lens having a higher refractive index and a higher light-controlling performance is required, but such a resin material is not known.

In order to solve the above-mentioned problem, in the present invention, there is provided a photochromic lens for eye glasses, which has such a constitution that gives a high refractive index, is excellent in light-controlling properties and makes the reduction of weight and thickness possible.

Solution to Problem

The present inventor has studied hard in order to solve the above-mentioned problem, and as the result, has found that a lens composed of a polymer of a photochromic polymerizable composition obtained by dissolving a photochromic compound into a monomer mixture containing a (meth)acrylic ester of a specific structure and divinylbenzene is suitable for the purpose as a photochromic lens, and that the lens can be obtained effectively by radically polymerizing the photochromic polymerizable composition containing a polymerization initiator through the use of a general cast polymerization method, thereby having completed the present invention on the basis of the knowledge.

That is, the present invention is a photochromic lens for eye glasses produced by polymerizing a polymerizable composition obtained by dissolving a photochromic compound into a monomer mixture including a first radically polymerizable monomer represented by general formula (I):

[Chem 1]

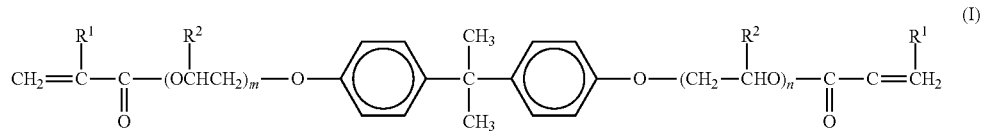

(where $R^1$ is a hydrogen atom or a methyl group, $R^2$ is a hydrogen atom or a methyl group, and m+n=0 to 4), a second radically polymerizable monomer represented by general formula (II):

[Chem 2]

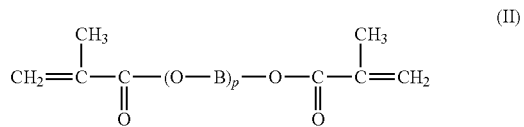

(in the formula, B represents an ethylene group or a linear or branched propylene group, and p represents a numeral of 1 to 9 on average), and divinylbenzene that has a purity of 50% or more and a divinylbenzene component and an ethylvinylbenzene component at a total content of 90% or more.

The photochromic lens for eye glasses of the above-mentioned present invention can be manufactured by radically polymerizing a polymerizable composition obtained by dissolving a photochromic compound into a monomer mixture containing a (meth)acrylic ester represented by the general formula (I) and (II) described above and divinylbenzene, particularly preferably by radically polymerizing the composition by a cast polymerization method.

According to the constitution of the photochromic lens for eye glasses of the above-mentioned present invention, by polymerizing the polymerizable composition obtained by dissolving the photochromic compound into the monomer mixture containing the first radically polymerizable monomer, the second radically polymerizable monomer and divinylbenzene, a high refractive index and mobility is imparted to the lens polymer to be obtained, and thus it becomes possible to raise the refractive power of the lens and to reduce the thickness and weight of the lens. In addition, it becomes possible to enhance solubility or dispersibility of a photochromic compound having an aromatic ring into a lens matrix.

In the photochromic lens for eye glasses of the present invention, furthermore, there can be adopted a constitution of containing, in the monomer mixture, the first radically polymerizable monomer of the general formula (I) in the range of 40 to 55% by mass, the second radically polymerizable monomer of the general formula (II) in the range of 5 to 20% by mass and the divinylbenzene component and the ethylvinylbenzene component in divinylbenzene in the range of 29 to 45% by mass in total.

In the case of adopting this constitution, a sufficiently high light-controlling performance and a sufficient surface hardness and refractive index are obtained.

Advantageous Effects of Invention

According to the above-mentioned present invention, in the lens polymer, it becomes possible to raise the refractive power of a lens and to reduce the thickness and weight of the lens. In addition, it becomes possible to enhance the solubility or dispersibility of a photochromic compound having an aromatic ring into the lens matrix.

Consequently, it is possible to realize a photochromic lens for eye glasses having a constitution of a high refractive index, excellent light-controlling properties, and having a lightweight and thin constitution.

Furthermore, the lens of the present invention is produced by polymerizing the polymerizable composition obtained by dissolving a photochromic compound into a monomer mixture, and thus can be manufactured by a low number of processes.

Consequently, irrespective of the lens shape, it becomes possible to mass-produce a lens having a certain light-controlling performance at a low manufacturing cost.

Moreover, since a surface hardened film and an antireflection layer can be imparted to the lens of the present invention by a usual method, the lens can be used favorably, in particular, as a lens for eye glasses.

DESCRIPTION OF EMBODIMENTS

In the photochromic lens for eye glasses of the present invention, as the material thereof, a photochromic polymerizable composition is used.

The photochromic polymerizable composition includes a monomer mixture containing a first radically polymerizable monomer represented by the general formula (I) described above, a second radically polymerizable monomer represented by the general formula (II) described above, and divinylbenzene having a purity of 50% or more and containing a divinylbenzene component and an ethylvinylbenzene component at a total content of 90% or more, and a photochromic compound, as indispensable components.

Each of the first radically polymerizable monomer and the second radically polymerizable monomer is composed of a (meth)acrylic ester.

The combination of the (meth)acrylic ester of the construction and divinylbenzene plays roles of imparting a high refractive index to a lens polymer to be obtained, reducing the thickness and weight of a lens, and at the same time, suppressing the obstacle of isomerization reaction of a photochromic compound in the lens matrix.

When the combination is not used, a high refractive index and a high light-controlling performance, that is, a deep coloration density and a quick density change cannot be obtained at the same time. Furthermore, the combination also has a function that enhances the solubility or dispersibility of a photochromic compound having an aromatic ring, into the lens matrix.

The (meth)acrylic ester being the first radically polymerizable monomer of general formula (I) may be used alone or in combination of two or more kinds, and the content thereof in the monomer mixture is preferably in the range of 40 to 55% by mass.

When the content is less than 40% by mass, a sufficient light-controlling performance is hard to be obtained, and when the content exceeds 55% by mass, the surface hardness of the lens may lower.

In consideration of the light-controlling performance, the surface hardness of the lens or the like, a more preferable content of (meth)acrylic ester being the first radically polymerizable monomer is in the range of 42 to 52% by mass.

Specific examples of the (meth)acrylic ester being the first radically polymerizable monomer of general formula (I) include 2,2'-bis[4-(methacryloyloxyethoxy)phenyl]propane (m+n=2.3, m+n=2.6, m+n=4), and the like.

The (meth)acrylic ester being the second radically polymerizable monomer of general formula (II) may also be used alone or in combination of two or more kinds, and the content thereof in the monomer mixture is preferably in the range of 5 to 20% by mass.

The (meth)acrylic ester being the second radically polymerizable monomer of general formula (II) serves to improve the strength of the lens in the monomer mixture composition system of the present invention.

The kind and the content of the (meth)acrylic ester being the second radically polymerizable monomer of general formula (II) exert a large influence on the coloration density, and the rate of coloration and decoloration of the photochromic polymer in the monomer mixture composition system of the present invention.

When the content is less than 5% by mass, the strength as a lens for eye glasses is insufficient, and when the content exceeds 20% by mass, the refractive index of the lens lowers, and thus a lens of reduced thickness and reduced weight cannot be obtained.

In consideration of the strength of the lens, the refractive index of the lens and the like, a more preferable content of the (meth)acrylic ester being the second radically polymerizable monomer is in the range of 6 to 15% by mass.

Specific examples of the (meth)acrylic ester being the second radically polymerizable monomer of general formula (II) include ethylene glycol dimethacrylate, diethylene glycol dimethacrylate, triethylene glycol dimethacrylate and the like.

In contrast, the divinylbenzene is preferably contained in the monomer mixture in the range of 29 to 45% by mass.

The divinylbenzene serves to enhance the refractive index, and at the same time, to accelerate the rate of coloration and decoloration of the lens.

When the content is less than 29% by mass, the refractive index becomes insufficient and the reaction rate as a photochromic lens can not be obtained sufficiently. In addition, when the content exceeds 45% by mass, a tendency of the lowering of the lens strength to be brittle is remarkable.

In consideration of a light-controlling performance, lens strength and the like, a more preferable content of the divinylbenzene is in the range of 32 to 42% by mass.

However, usually, the divinylbenzene monomer is a mixture of the m-body and p-body thereof and the m-body and p-body of ethylvinylbenzene, and ones having various purities are commercially available. In the present invention, such commercially available divinylbenzene can be used, and one containing the m-body and the p-body with a total purity of 50% or more can be used favorably.

The content of the divinylbenzene in the monomer mixture in the present invention indicates an amount corresponding to the total of divinylbenzene and the m-body and p-body of ethylvinylbenzene.

Furthermore, it is desirable that the total content of the divinylbenzene component (the m-body and p-body) and the ethylvinylbenzene component (the m-body and p-body) is 90% or more and the content of components other than these is 10% or less.

In the monomer composition of the present invention, in addition to the above-mentioned components, other monomers for lens may be contained in a range that does not impair the effect of the present invention.

No particular limitation is imposed on other monomers for lens if they have a radical polymerizable property and give a transparent polymer substance, and preferable examples thereof include monofunctional (meth)acrylic esters such as methyl (meth)acrylate, ethyl (meth)acrylate, n-butyl (meth)acrylate, ethylhexyl (meth)acrylate, cyclohexyl (meth)acrylate, 2-hydroxyethyl (meth)acrylate, glycidyl (meth)acrylate, isobornyl (meth)acrylate and adamantyl (meth)acrylate, and polyfunctional (meth)acrylic esters such as 1,4-butanediol di(meth)acrylate, 1,6-hexanediol di(meth)acrylate, glycerin di(meth)acrylate, trimethylolpropane tri (meth)acrylate and pentaerythritol tri(meth)acrylate.

From the standpoint of lens performance, these components are contained preferably in the monomer mixture in the range not exceeding 20% by mass.

When these components exceed 20% by mass, the refractive index lowers to cause insufficient thickness reduction and weight reduction of the lens.

Examples of other monomers for lens excluding the above-mentioned include nuclear-substituted styrenes represented by general formula (III) below such as styrene, methylstyrene, dimethylstyrene, ethylstyrene, α-methylstyrene, chlorostyrene, dichlorostyrene, bromostyrene and p-chloromethylstyrene, and aromatic (meth)acrylic esters represented by general formula (IV) below such as benzyl (meth)acrylate.

[Chem 3]

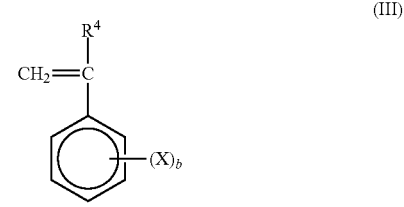

(III)

(where, $R^4$ is a hydrogen atom or a methyl group, X represents a hydrogen atom, a chlorine atom, a bromine atom, a methoxy group, an amino group, a nitro group, a phenyl group or a phenoxy group, b is 1 or 2, which represents the number of the group X)

[Chem 4]

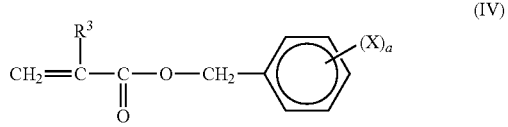

(IV)

(where, $R^3$ is a hydrogen atom or a methyl group, X represents a hydrogen atom, a chlorine atom, a bromine atom, a methoxy group, an amino group, a nitro group, a phenyl group or a phenoxy group, a is 1 or 2, which represents the number of the group X)

Furthermore, in addition to the above-mentioned aromatic polymerizable monomers, there are mentioned α-methylstyrene dimer, naphthyl (meth)acrylates such as α-naphthyl (meth)acrylate and β-naphthyl (meth)acrylate, phenoxyethyl (meth)acrylate, vinylnaphthalenes such as 1-vinylnaphthalene and 2-vinylnaphthalene, aromatic polymerizable monomers such as 4-vinylbiphenyl and vinyl phenyl sulfide, acrylonitrile, methacrylonitrile, maleic anhydride, N-substituted maleimide, and, furthermore, allyl compounds such as diethylene glycol bis allyl carbonate and diallyl phthalate.

These monomers can be used alone or in combination of two or more kinds.

In the present invention, no particular limitation is imposed on the photochromic compound to be used in the photochromic polymerizable composition, and an arbitrary compound can be selected and used suitably from publicly known compounds that can be used for a photochromic lens.

For example, from photochromic compounds such as spiropyran-based compounds, chromene-based compounds, spirooxazine-based compounds and fulgide-based compound, one kind or two or more kinds can be selected and used by mixture in accordance with desired coloration.

Examples of the spiropyran-based compounds include respective substituted bodies of indolinospirobenzopyran substituted at an indole ring and a benzene ring by halogen, a methyl, ethyl, methylene, ethylene or hydroxyl group, respective substituted bodies of indolinospironaphthopyran substituted at an indole ring and a naphthalene ring by halogen, a methyl, ethyl, methylene, ethylene or hydroxyl group, respective substituted bodies of indolinospiroquinolinopyran substituted at an indole ring by halogen, a methyl, ethyl, methylene, ethylene or hydroxyl group, respective substituted bodies of indolinospiropyridopyran substituted at an indole ring by halogen, a methyl, ethyl, methylene, ethylene or hydroxyl group, and the like.

Examples of the chromene-based compounds include spiro[norbornane-2,2'-[2H]benzo[h]chromene], spiro[bicyclo[3.3.1]nonane-9,2'-[2H]benzo[h]chromene], 7'-methoxyspiro[bicyclo[3.3.1]nonane-9,2'-[2H]benzo[h]chromene], 7'-methoxyspiro[norbornane-2,2'-[2H]benzo[f]chromene], 2,2-dimethyl-7-octoxy[2H]benzo[h]chromene, spiro[2-bicyclo[3.3.1]nonene-9,2'-[2H]benzo[h]chromene], spiro[2-bicyclo[3.3.1]nonene-9,2'-[2H]benzo[f]chromene], 6-morpholino-3,3-bis(3-fluoro-4-methoxyphenyl)-3H-benzo[f]chromene, 5-isopropyl-2,2-diphenyl-2H-benzo[h]chromene, and the like.

Examples of the spirooxazine-based compounds include respective substituted bodies of indolinospirobenzooxazine substituted at an indole ring and a benzene ring by halogen, a methyl, ethyl, methylene, ethylene or hydroxyl group, respective substituted bodies of indolinospironaphthooxazine substituted at an indole ring and a naphthalene ring by halogen, a methyl, ethyl, methylene, ethylene or hydroxyl group, respective substituted bodies of indolinospirophenanthrooxazine substituted at an indole ring by halogen, a methyl, ethyl, methylene, ethylene or hydroxyl group, respective substituted bodies of indolinospiroquinolinooxazine substituted at an indole ring by halogen, a methyl, ethyl, methylene, ethylene or hydroxyl group, respective substituted bodies of piperidinospironaphtooxazine substituted at a piperidine ring and a naphthalene ring by halogen, a methyl, ethyl, methylene, ethylene or hydroxyl group, and the like.

Examples of the fulgide-based compounds include N-cyanomethyl-6,7-dihydro-4-methyl-2-phenylspiro(5,6-benzo[b]thiophenedicarboximide-7,2'-tricyclo[3.3.1.1$^{3,7}$]decane], N-cyanomethyl-6,7-dihydro-2-(p-methoxyphenyl)-4-methylspiro (5,6-benzo[b]thiophenedicarboximide-7,2'-tricyclo [3.3.1.1$^{3,7}$]decane), 6,7-dihydro-N-methoxycarbonylmethyl-4-methyl-2-phenylspiro(5,6-benzo[b]thiophenedicarboximide-7,2'-tricyclo[3.3.1.1$^{3,7}$]decane), 6,7-dihydro-4-methyl-2-(p-methylphenyl)-N-nitromethylspiro(5,6-benzo[b]thiophenedicarboximide-7,2'-tricyclo [3.3.1.1$^{3,7}$]decane), N-cyanomethyl-6,7-dihydro-4-cyclopropyl-3-methylspiro(5,6-benzo[b]thiophenedicarboximide-7,2'-tricyclo[3.3.1.1$^{3,7}$]decane), N-cyanomethyl-6,7-dihydro-4-cyclopropylspiro(5,6-benzo[b]thiophenedicarboximide-7,2'-tricyclo[3.3.1.1$^{3,7}$]decane), N-cyanomethyl-6,7-dihydro-2-(p-methoxyphenyl)-4-cyclopropyl spiro(5,6-benzo[b]thiophenedicarboximide-7,2'-tricyclo[3.3.1.1$^{3,7}$]decane), and the like.

As to photochromic compounds, in recent years, various ones have been commercially available in addition to the above-mentioned compounds, and thus they can also be used. As to commercially available photochromic compounds, it is often the case that the molecular structure thereof is not clarified, but irrespective of the molecular structure, in the polymerizable composition of the present invention, the coloration density and reaction rate of each of the photochromic compounds can be maintained at a high level.

The use amount of a photochromic compound is selected appropriately depending on the kind of the photochromic compound to be used, and from the standpoint of obtaining a good photochromic performance, the amount is selected usually in the range of 0.001 to 3.0 parts by mass relative to 100 parts by mass of the monomer mixture, preferably in the range of 0.01 to 1.0 part by mass.

In the photochromic polymerizable composition, as necessary, various additive components, for example, a heat stabilizer, an antioxidant, an ultraviolet absorber, a releasing agent, an antistatic agent, dye and the like can be contained.

In order to manufacture the photochromic lens of the present invention, it is sufficient to add a polymerization initiator to the above-mentioned photochromic polymerizable composition and to perform radical polymerization of the same. On the polymerization initiator, particular limitation is not imposed, and when the most general thermal polymerization method is to be adopted, an organic peroxide or an azo compound known as a radical initiator can be used. In particular, an azo compound such as 2,2'-azobisisobutyronitrile or 2,2'-azobis(2,4-dimethylvaleronitrile), or an organic peroxide such as tert-butylperoxy neodecanate or 1,1,3,3-tetramethylbutyl peroxy-2-ethylhexanate is preferable from the standpoint of a small influence on the photochromic compound.

The polymerization initiator may be used alone or may be used in combination of two or more kinds, and the use amount thereof is selected usually in the range of 0.01 to 3.0 parts by mass relative to 100 parts by mass of the monomer mixture, preferably in the range of 0.05 to 1.5 parts by mass.

As the polymerization method, both of a thermal polymerization method and a photo polymerization method can be used, but a thermal polymerization method is usually used, and in particular, a cast polymerization method is favorable. Heating temperature in a thermal polymerization method varies depending on the kind of polymerization initiator to be used, and usually in the range of 25 to 120° C., heating is performed appropriately in various temperature rise patterns.

As to general operations for manufacturing the photochromic lens of the present invention, the monomer mixture, the photochromic compound, the polymerization initiator, and various additive components used according to desire are mixed, a sufficient stirring was carried out to prepare a homogeneous photochromic polymerizable composition, which is then injected into a lens mold and is heat-polymerized. Heating conditions for the polymerization vary depending on the polymerization initiator to be used, and the polymerization is usually performed in the range of 20 to 80° C. for 6 to 48 hours.

Furthermore, in order to raise the degree of polymerization of the lens, the reaction temperature may be raised gradually to a region of 80° C. or higher along with the progress of the polymerization reaction. After the completion of the polymerization, the lens is released from the mold, and as necessary, reheating (annealing) is preferably performed at an appropriate temperature for correcting the strain of surface generated in the polymerization process or at the time of the releasing.

The photochromic lens thus obtained is provided, on the surface, with a primer coat layer for enhancing anti-shock properties, a hard coat layer for raising the surface hardness and the like, as necessary. In order to form these coat layers, there is used a method of coating the coating composition on the lens base material usually by a dipping method, a spin coat method, a roll coat method, a spray coat method, or the like. The curing of the coated coating composition is generally performed by heating treatment. In the heating treatment, the heating temperature is preferably from 40 to 150° C., particularly preferably from 80 to 130° C. In addition, the heating time is preferably from 1 to 4 hours.

On the surface of the cured film obtained as described above, an antireflection film can be provided in order to enhance the antireflective effect of the plastic lens. The antireflection film can be formed by stacking a thin film having a single layer or multi-layers composed of a dielectric material such as $SiO$, $SiO_2$, $Si_3N_4$ $TiO_2$, $ZrO_2$, $Al_2O_3$ or $MgF_2$ by a vacuum evaporation method, an ion sputtering method, an ion plating method, or the like.

By the formation of the antireflection film, the reflection at the interface of the lens and the air can be kept low. When the antireflection film is made of a single layer, the optical film thickness thereof is preferably $\lambda 0/4$ ($\lambda 0=450$ to $650$ nm). In addition, a multilayer antireflection film that is composed of two layers having optical film thicknesses of $\lambda 0/4$-$\lambda 0/4$ and different refractive indices from each other, or that is composed of three layers having optical film thicknesses of $\lambda 0/4$-$\lambda 0/2$-$\lambda 0/4$ or $\lambda 0/4$-$\lambda 0/4$-$\lambda 0/4$ and different refractive indices from each other, or a multilayer antireflection film composed of an antireflection film by a multilayer coat in which a part is substituted by an equivalent film is useful.

The photochromic lens of the present invention fabricated as described above has a high refractive index, and thus the lens has a high refractive power in spite of its reduced thickness and reduced weight, and in addition, has excellent characteristics of a high coloration density, and high coloration and high decoloration rates.

EXAMPLES

Next, the present invention will be explained in more detail on the basis of Examples, but the present invention is not limited in any way by these Examples.

Meanwhile, in the Examples and Comparative Examples, evaluation methods of the light-controlling performance and apparatuses used are as follows.

<Evaluation Method of Light-Controlling Performance>

(a) Light transmittance in colored state (T % max): under conditions of temperature of 23° C. and ultraviolet intensity of 1.2 mW/cm² measured with an integrating actinometer, through the use of a xenon lamp (300 W) light source device, a lens was colored for 5 minutes and the spectrum at the time was measured with an instantaneous multichannel photodetector system. In the measured spectrum, the light transmittance at the maximum absorption wavelength ($\lambda_{max}$) is defined as the light transmittance in colored state (T % max). The lower the light transmittance is, the higher the coloration density is.

(b) Decoloration half-life period ($F_{1/2}$): it is defined as a time period required until the absorbance of a lens at the maximum absorption wavelength ($\lambda_{max}$) is lowered to ½ after the coloration for 5 minutes and then the stop of irradiation with light. The shorter the time period is, the faster the decoloration rate is.

<Apparatuses Used>

Light source device: a xenon lamp (300 W) device "UIT-501C," manufactured by USHIO INC.

Integrating actinometer: integrating actinometer "UIT-102 (optical receiver UVD365PD)," manufactured by USHIO INC.

Instantaneous multichannel photodetector system: "MCPD-3000," manufactured by OTSUKA ELECTRONICS CO., LTD.

Refractive index detector: refractive index detector "KPR-200," manufactured by KALNEW OPTICAL INDUSTRIAL CO., LTD.

Lens meter: "AL-3500," manufactured by HOYA (c) Shock resistance test: Performed using a 16 g steel ball in accordance with the drop ball test method determined in FDA (Food and Drag Administration) standard of USA. Lenses in which a crack or breakage is generated after the test are determined to be rejected (x), and lenses that do not change the outer appearance as compared with that before the test are determined to be acceptable (○).

(Preparation of Coating Composition)

A liquid obtained by adding 2.0 parts by mass of 0.5 N hydrochloric acid and 20 parts by mass of acetic acid to 240 parts by mass of colloidal silica having 40% of $SiO_2$ concentration (SNOWTEX-40, water-dispersed silica, average particle diameter of 10 to 20 nm, manufactured by Nissan Chemical Industries, Ltd.) was kept at 35° C., in which 95 parts by mass of γ-glycidoxypropyltrimethoxysilane (a tri-functional organic silicon compound) was dropped with stirring, stirred for 8 hours, and, after that, left to stand for 16 hours.

To 320 parts by mass of the hydrolyzed solution, 80 parts by mass of methyl cellosolve, 120 parts by mass of isopropyl alcohol, 40 parts by mass of butyl alcohol, 16 parts by mass of aluminum acetylacetone, 0.2 parts by mass of a silicone-based surfactant and 0.1 part by mass of an ultraviolet absorber were added, which was stirred for 8 hours and ripened at room temperature for 24 hours to give a coating composition. This is denoted by a coating composition A.

Example 1

In 100 parts by mass of a mixed solution of 50% by mass of 2,2'-bis[4-(methacryloyloxyethoxy)phenyl]propane (a compound where $R^1$ is a methyl group, $R^2$ is a hydrogen atom and m+n=2.3 in general formula (I)), 10% by mass of ethylene glycol dimethacrylate (p=3) and 40% by mass of divinylbenzene (purity 96%, total of this and an ethylvinylbenzene component is 99%), 0.02 parts by mass of Photochromic Dyes PH-4115 manufactured by Chromtech was dissolved as a photochromic compound, to which 1.0 part by mass of 2,4-diphenyl-4-methyl-1-pentene was added and mixed as a polymerization degree adjuster.

Next, the preparation obtained by the mixing was poured into two kinds of molds, each being made of 2 glass molds and a plastic gasket.

Furthermore, each mold was placed in a hot air circulation type heating furnace and heated at 40° C. for 12 hours. After that, the temperature was raised up to 85° C. over 4 hours and heating was performed for 2 hours, for polymerization.

After that, the mold was removed and a polymer was taken out.

Each of the obtained polymers was a resin composition having a lens shape and high transparency.

The resin composition was cut into a circle with a diameter of 70 mm on the basis of the optical center, which was heated furthermore at 120° C. for 2 hours for performing annealing.

In this way, a photochromic lens was fabricated to be used as a sample in Example 1.

One of the lenses formed with two molds being samples in Example 1 was a lens having a high refractive power, irrespective of having a small thickness and being lightweight, such as the central thickness of 2.0 mm, edge thickness (peripheral thickness) of 6.8 mm, mass (WT) of 19.6 g, diopter power (D) of −4.31. The measurement of the refractive index of the lens gave ne: 1.594.

The other one was a flat lens of the central thickness of 2.0 mm and a diopter power of 0.00.

In addition, each of these two lenses was transparent without strain and uniform optically, and had a good light-controlling performance such as being colored in blue by the sun's rays and being decolored immediately when the rays were shielded.

When the light-controlling performance was evaluated through the use of the obtained flat lens, light transmittance at the maximum absorption wavelength ($\lambda_{max}$: 582 nm) in the colored state (T % max) was 8.1%, and the decoloration half-life period ($F_{1/2}$) was 132 seconds.

Next, by using an ultraviolet reforming device 00-2506 (wavelengths of 185 nm and 245 nm) that is a low pressure mercury lamp irradiation device manufactured by EYE GRAPHICS CO., LTD., this flat lens was treated at an irradiation interval of 30 mm for 180 seconds. Subsequently, the lens was immersed in a 10% NaOH aqueous solution at 60° C. for 360 seconds, and after that, was washed and dried by heating. After cooling, the coating composition A was applied by a dipping method (pull up rate: 20 cm/min) at 10° C., which was heated and cured at 110° C. for 90 minutes. The lens with a surface hardened film thus obtained had good surface hardness and film adhesiveness, and was one that was able to be used favorably as a lens.

Next, by using the flat lens, a shock resistance test was performed, in which the outer appearance of the lens showed no change as compared with that before the test, which was determined as acceptable.

Also as to samples in respective Examples and Comparative Examples, in the same way as that in Example 1, there were measured the dimension of respective lenses fabricated with two kinds of molds, and the diopter power (D) and mass (WT) with respect to the refractive power lens.

In addition, using the flat lens, by the evaluation method of the light-controlling performance, there were obtained the light transmittance in colored state (T % max) at the maximum absorption wavelength ($\lambda_{max}$: 582 nm) and the decoloration half-life period ($F_{1/2}$). Furthermore, using the flat lens, the shock resistance test was performed.

In Tables 1 to 4, there are shown addition amount of three components (% by mass) in preparations of respective examples, and, as the measurement results, the refractive index (ne), diopter power (D), mass (WT), light transmittance (T % max) in the colored state and decoloration half-life period ($F_{1/2}$), and the result of anti-shock test.

Examples 2 and 3

In just the same way as that in Example 1, except for changing the value of 2,2'-bis[4-(methacryloyloxyethoxy)phenyl]propane of general formula (I) as shown in Table 1, photochromic lenses were fabricated.

These lenses were evaluated in the same way as that in Example 1, and as shown in Table 1, the results showed that these lenses had the same good performances as those in Example 1 and were able to be used favorably as a lens for eye glasses.

Examples 4 to 7

In just the same way as that in Example 2, except for changing the value of p of polyethylene glycol dimethacrylate of general formula (II) as shown in Table 1, in place of triethylene glycol dimethacrylate, photochromic lenses were fabricated.

These lenses were evaluated in the way as that in Example 1, and as shown in Table 1, the results showed that lenses had the same good performances as those in Example 1 and were able to be used favorably as a lens for eye glasses.

Comparative Example 1

In just the same way as that in Example 1, except for changing 2,2'-bis[4-(methacryloyloxyethoxy)phenyl]propane of general formula (I) to one having m+n=10.0, a photochromic lens was fabricated.

The lens was evaluated in the same way as that in Example 1, and as shown in Table 1, the results showed good properties, but, since the value of m+n in general formula (I) was large, out of the scope of the present invention, the rigidity as the base material was insufficient and tends to change the shape, and thus the lens was one that was not able to be used as a lens for eye glasses.

Comparative Example 2

In just the same way as that in Example 2, except for changing the ethylene glycol dimethacrylate to one having p=14, a photochromic lens was fabricated.

The lens was evaluated in the same way as that in Example 1, and as shown in Table 1, the results showed good properties, but since the value of p was large, out of the scope of the present invention, the rigidity as the base material was insufficient and tends to change the shape, and thus the lens was one that was not able to be used as a lens for eye glasses.

TABLE 1

| | BPE | | EGM | | DVB 96 | | REFRACTIVE INDEX ne | DIOPTER POWER D | WEIGHT WT | TRANSMITTANCE IN COLORED STATE T %$_{MAX}$ | DECOLORATION HALF-LIFE PERIOD $F_{1/2}$ | SHOCK RESISTANCE TEST |
|---|---|---|---|---|---|---|---|---|---|---|---|---|
| | m+n | ADDITION % | p | ADDITION % | ADDITION % | DVB % | | | | | | |
| EXAMPLE 1 | 2.3 | 50 | 3 | 10 | 40 | 39.6 | 1.594 | −4.31 | 19.6 | 8.1 | 132 | ○ |
| EXAMPLE 2 | 2.6 | 50 | 3 | 10 | 40 | 39.6 | 1.592 | −4.31 | 19.6 | 8.7 | 95 | ○ |
| EXAMPLE 3 | 4.0 | 50 | 3 | 10 | 40 | 39.6 | 1.589 | −4.29 | 19.5 | 8.3 | 95 | ○ |
| EXAMPLE 4 | 2.6 | 50 | 1 | 10 | 40 | 39.6 | 1.591 | −4.32 | 19.4 | 9.5 | 118 | ○ |

TABLE 1-continued

| | BPE | | EGM | | DVB 96 | | RE-FRAC-TIVE | DI-OPTER | WEIGHT | TRANS-MITTANCE IN COLORED STATE | DECOLOR-ATION HALF-LIFE PERIOD | SHOCK RESIS-TANCE |
| | m+n | ADDI-TION % | p | ADDI-TION % | ADDI-TION % | DVB % | INDEX ne | POWER D | WT | T %$_{MAX}$ | F$_{1/2}$ | TEST |
|---|---|---|---|---|---|---|---|---|---|---|---|---|
| EXAMPLE 5 | 2.6 | 50 | 2 | 10 | 40 | 39.6 | 1.591 | −4.31 | 19.5 | 9.0 | 105 | ○ |
| EXAMPLE 6 | 2.6 | 50 | 4 | 10 | 40 | 39.6 | 1.591 | −4.30 | 19.6 | 9.5 | 96 | ○ |
| EXAMPLE 7 | 2.6 | 50 | 9 | 10 | 40 | 39.6 | 1.590 | −4.30 | 19.4 | 9.5 | 95 | ○ |
| COMPARATIVE EXAMPLE 1 | 10.0 | 50 | 3 | 10 | 40 | 39.6 | 1.580 | −4.22 | 19.3 | 12.2 | 105 | — |
| COMPARATIVE EXAMPLE 2 | 2.6 | 50 | 14 | 10 | 40 | 39.6 | 1.589 | −4.29 | 19.5 | 11.0 | 110 | — |

Examples 8 to 14

In just the same ways as those in Examples 1 to 7, except for changing the divinylbenzene to one having purity of 57% (the total of the m-body and p-body), the total of the divinylbenzene component and the ethylvinylbenzene component of 95% (the total of respective m-bodies and p-bodies), and other components of 5%, photochromic lenses were fabricated.

These lenses were evaluated in the way as that in Example 1, and as shown in Table 2, the results showed that lenses had the same good performances as those in Example 1 and were able to be used favorably as a lens for eye glasses.

Comparative Example 3

In just the same way as that in Comparative Example 1, except for changing the divinylbenzene to one having purity of 57% (the total of the m-body and p-body), the total of the divinylbenzene component and the ethylvinylbenzene component of 95% (the total of respective m-bodies and p-bodies), and other components of 5%, a photochromic lens was fabricated.

The lens was evaluated in the same way as that in Example 1, and as shown in Table 2, the results showed good properties, but, since the value of m+n in general formula (I) was large, out of the scope of the present invention in the same way as that in Comparative Example 1, rigidity as the base material was insufficient and tends to change the shape, and thus the lens was one that was not able to be used as a lens for eye glasses.

Comparative Example 4

In just the same way as that in Comparative Example 2, except for changing the divinylbenzene to one having purity of 57% (the total of the m-body and p-body), the total of the divinylbenzene component and the ethylvinylbenzene component of 95% (the total of respective m-bodies and p-bodies), and other components of 5%, a photochromic lens was fabricated.

The lens was evaluated in the same way as that in Example 1, and as shown in Table 2, the results showed good properties, but since the value of p in general formula (II) was large, out of the scope of the present invention in the same way as that in Comparative Example 2, the rigidity as the base material was insufficient and tends to change the shape, and thus the lens was one that was not able to be used as a lens for eye glasses.

TABLE 2

| | BPE | | EGM | | DVB 57 | | RE-FRAC-TIVE | DI-OPTER | WEIGHT | TRANS-MITTANCE IN COLORED STATE | DECOLOR-ATION HALF-LIFE PERIOD | SHOCK RESIS-TANCE |
| | m+n | ADDI-TION % | p | ADDI-TION % | ADDI-TION % | DVB % | INDEX ne | POWER D | WT | T %$_{MAX}$ | F$_{1/2}$ | TEST |
|---|---|---|---|---|---|---|---|---|---|---|---|---|
| EXAMPLE 8 | 2.3 | 50 | 3 | 10 | 40 | 38.0 | 1.583 | −4.24 | 19.4 | 8.0 | 145 | ○ |
| EXAMPLE 9 | 2.6 | 50 | 3 | 10 | 40 | 38.0 | 1.582 | −4.23 | 19.4 | 7.8 | 122 | ○ |
| EXAMPLE 10 | 4.0 | 50 | 3 | 10 | 40 | 38.0 | 1.580 | −4.21 | 19.3 | 8.2 | 110 | ○ |
| EXAMPLE 11 | 2.6 | 50 | 1 | 10 | 40 | 38.0 | 1.582 | −4.23 | 19.5 | 8.5 | 129 | ○ |
| EXAMPLE 12 | 2.6 | 50 | 2 | 10 | 40 | 38.0 | 1.582 | −4.22 | 19.3 | 8.9 | 115 | ○ |
| EXAMPLE 13 | 2.6 | 50 | 4 | 10 | 40 | 38.0 | 1.582 | −4.22 | 19.3 | 9.5 | 112 | ○ |
| EXAMPLE 14 | 2.6 | 50 | 9 | 10 | 40 | 38.0 | 1.581 | −4.21 | 19.4 | 9.5 | 110 | ○ |
| COMPARATIVE EXAMPLE 3 | 10.0 | 50 | 3 | 10 | 40 | 38.0 | 1.570 | −4.13 | 19.1 | 12.0 | 120 | — |
| COMPARATIVE EXAMPLE 4 | 2.6 | 50 | 14 | 10 | 40 | 38.0 | 1.580 | −4.20 | 19.3 | 12.0 | 115 | — |

Examples 15 to 19

In just the same way as that in Example 2, except for changing the component composition of the mixed solution before dissolving the photochromic compound in the scope of the present invention as shown in Table 3, photochromic lenses were fabricated.

These lenses were evaluated in the same way as that in Example 1, and as shown in Table 3, the results showed that these lenses had good performances and were able to be favorably used as a lens for eye glasses.

Comparative Examples 5 to 12

In just the same way as that in Example 2, except for changing the component composition of the mixed solution before dissolving the photochromic compound, so as to be out of the scope of the present invention as shown in Table 3, photochromic lenses were fabricated.

These lenses were evaluated in the same way as that in Example 1, and the results were as shown in Table 3. Since the component composition was out of the favorable scope of the present invention, the lenses had problems such as not constituting a lens having a strong diopter power because of insufficiency of the refractive index, not being accepted in the shock resistance test because of insufficiency of the strength, and these lenses were not ones to be used favorably as a lens for eye glasses.

Examples 20 to 22

In just the same way as that in Example 9 (the divinylbenzene had a purity of 57%), except for changing the component composition of the mixed solution before dissolving the photochromic compound in the scope of the present invention as shown in Table 4, photochromic lenses were fabricated.

These lenses were evaluated in the same way as that in Example 1. As shown in Table 4, the results showed that these lenses had good performances and were able to be favorably used as a lens for eye glasses.

Comparative Examples 13 to 20

In just the same way as that in Example 9 (the divinylbenzene had a purity of 57%), except for changing the component composition of the mixed solution before dissolving the photochromic compound, so as to be out of the scope of the present invention as shown in Table 4, photochromic lenses were fabricated.

These lenses were evaluated in the same way as that in Example 1, and the results were as shown in Table 4. Since the component composition was out of the favorable scope of the present invention, the lenses had problems such as not constituting a lens having a strong diopter power because of insufficiency of the refractive index, not being accepted in the shock resistance test because of insufficiency of the strength, and these lenses were not ones to be used favorably as a lens for eye glasses.

TABLE 3

| | BPE | | | EGM | | DVB 96 | | REFRACTIVE INDEX $n_e$ | DIOPTER POWER D | WEIGHT WT | TRANSMITTANCE IN COLORED STATE $T\%_{MAX}$ | DECOLORATION HALF-LIFE PERIOD $F_{1/2}$ | SHOCK RESISTANCE TEST |
|---|---|---|---|---|---|---|---|---|---|---|---|---|---|
| | m + n | ADDITION % | p | ADDITION % | ADDITION % | DVB % | | | | | | | |
| EXAMPLE 15 | 2.6 | 50 | 3 | 5 | 45 | 44.5 | | 1.597 | −4.34 | 19.5 | 9.0 | 101 | ○ |
| EXAMPLE 16 | 2.6 | 50 | 3 | 20 | 30 | 29.7 | | 1.580 | −4.22 | 20.0 | 9.5 | 99 | ○ |
| EXAMPLE 17 | 2.6 | 45 | 3 | 10 | 45 | 44.5 | | 1.594 | −4.32 | 19.5 | 9.0 | 118 | ○ |
| EXAMPLE 18 | 2.6 | 55 | 3 | 10 | 35 | 34.6 | | 1.588 | −4.28 | 19.8 | 9.5 | 120 | ○ |
| EXAMPLE 19 | 2.6 | 40 | 3 | 20 | 40 | 39.6 | | 1.585 | −4.26 | 19.8 | 9.8 | 121 | ○ |
| COMPARATIVE EXAMPLE 5 | 2.6 | 50 | 3 | 0 | 50 | 49.5 | | 1.603 | −4.39 | 19.4 | 8.8 | 110 | x |
| COMPARATIVE EXAMPLE 6 | 2.6 | 50 | 3 | 30 | 20 | 19.8 | | 1.565 | −4.11 | 20.3 | 9.4 | 133 | ○ |
| COMPARATIVE EXAMPLE 7 | 2.6 | 50 | 3 | 40 | 10 | 9.9 | | 1.554 | −4.02 | 20.5 | 9.0 | 198 | ○ |
| COMPARATIVE EXAMPLE 8 | 2.6 | 50 | 3 | 50 | 0 | 0.0 | | 1.541 | −3.92 | 20.9 | 14.4 | 269 | ○ |
| COMPARATIVE EXAMPLE 9 | 2.6 | 0 | 3 | 10 | 90 | 89.1 | | 1.618 | −4.50 | 18.5 | 9.8 | 165 | x |
| COMPARATIVE EXAMPLE 10 | 2.6 | 30 | 3 | 10 | 60 | 59.4 | | 1.602 | −4.37 | 19.1 | 9.3 | 148 | x |
| COMPARATIVE EXAMPLE 11 | 2.6 | 70 | 3 | 10 | 20 | 19.8 | | 1.578 | −4.21 | 20.1 | 11.0 | 173 | ○ |
| COMPARATIVE EXAMPLE 12 | 2.6 | 60 | 3 | 0 | 40 | 39.6 | | 1.596 | −4.34 | 19.7 | 10.2 | 126 | x |

TABLE 4

|  | BPE | | EGM | | DVB 57 | | REFRACTIVE INDEX ne | DIOPTER POWER D | WEIGHT WT | TRANSMITTANCE IN COLORED STATE T%$_{MAX}$ | DECOLORATION HALF-LIFE PERIOD F$_{1/2}$ | SHOCK RESISTANCE TEST |
|---|---|---|---|---|---|---|---|---|---|---|---|---|
|  | m+n | ADDITION % | p | ADDITION % | ADDITION % | DVB % | | | | | | |
| EXAMPLE 20 | 2.6 | 50 | 3 | 5 | 45 | 42.7 | 1.585 | −4.23 | 19.2 | 8.4 | 125 | ○ |
| EXAMPLE 21 | 2.6 | 45 | 3 | 10 | 45 | 42.7 | 1.584 | −4.22 | 19.2 | 9.1 | 129 | ○ |
| EXAMPLE 22 | 2.6 | 55 | 3 | 10 | 35 | 33.2 | 1.580 | −4.21 | 19.6 | 9.0 | 133 | ○ |
| COMPARATIVE EXAMPLE 13 | 2.6 | 50 | 3 | 0 | 50 | 47.5 | 1.590 | −4.28 | 19.1 | 8.5 | 127 | × |
| COMPARATIVE EXAMPLE 14 | 2.6 | 50 | 3 | 20 | 30 | 28.5 | 1.571 | −4.14 | 19.8 | 8.2 | 134 | ○ |
| COMPARATIVE EXAMPLE 15 | 2.6 | 50 | 3 | 30 | 20 | 19.0 | 1.561 | −4.08 | 20.0 | 9.3 | 166 | ○ |
| COMPARATIVE EXAMPLE 16 | 2.6 | 50 | 3 | 40 | 10 | 9.5 | 1.552 | −4.00 | 20.3 | 10.2 | 205 | ○ |
| COMPARATIVE EXAMPLE 17 | 2.6 | 0 | 3 | 10 | 90 | 85.5 | 1.598 | −4.33 | 18.1 | 10.3 | 193 | × |
| COMPARATIVE EXAMPLE 18 | 2.6 | 30 | 3 | 10 | 60 | 57.0 | 1.589 | −4.26 | 18.7 | 9.6 | 142 | × |
| COMPARATIVE EXAMPLE 19 | 2.6 | 70 | 3 | 10 | 20 | 19.0 | 1.571 | −4.14 | 20.1 | 9.5 | 184 | ○ |
| COMPARATIVE EXAMPLE 20 | 2.6 | 60 | 3 | 0 | 40 | 38.0 | 1.589 | −4.26 | 19.4 | 10.0 | 170 | × |

As is known from the results above, by adopting the constitution of the photochromic lens of the present invention as in Examples 1 to 22, the lens being produced by polymerizing the polymerizable composition prepared by dissolving the photochromic compound into the monomer mixture containing the first radically polymerizable monomer, the second radically polymerizable monomer and divinylbenzene in moderate contents, the photochromic lens being lightweight, having high refractive power and high refractive index, and excellent light-controlling performance is obtained.

The invention claimed is:

1. A photochromic lens for eye glasses, which is produced by polymerizing a polymerizable composition obtained by dissolving a photochromic compound into a monomer mixture comprising:

a first radically polymerizable monomer represented by general formula (I)

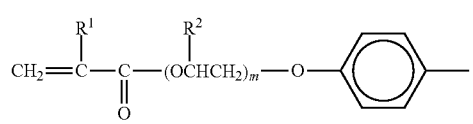
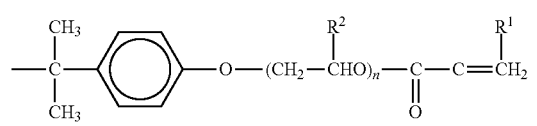

(where $R^1$ is a hydrogen atom or a methyl group, $R^2$ is a hydrogen atom or a methyl group, and m+n=0 to 4);

a second radically polymerizable monomer represented by general formula (II)

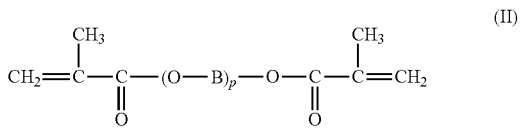

(in the formula, B is an ethylene group or a linear or branched propylene group, and p represents a numeral of 1 to 9 on average); and divinylbenzene that contains a divinylbenzene component and an ethylvinylbenzene component, the divinylbenzene component contained in the range of 50% or more, and the combination of the divinylbenzene component and the ethylvinylbenzene component contained in the range of 90% or more, wherein, in the monomer mixture, the first radically polymerizable monomer of the general formula (I) is contained in the range of 40 to 55% by mass, the second radically polymerizable monomer of the general formula (II) is contained in the range of 5 to 20% by mass, and the combination of the divinylbenzene component and the ethylvinylbenzene component of the divinylbenzene is contained in the range of 29 to 45% by mass, and wherein, in the monomer mixture, the first radically polymerizable monomer of the general formula (I), the second radically polymerizable monomer of the general formula (II), and the combination of the divinylbenzene component and the ethylvinylbenzene component of the divinylbenzene, are contained in the range of 100% by mass in total.

2. The photochromic lens for eye glasses according to claim 1, wherein a refractive index is in the range of 1.58 or more.

* * * * *